United States Patent [19]

Becker et al.

[11] 4,024,221

[45] May 17, 1977

[54] LOW TEMPERATURE METHOD OF PRODUCING BORON TRICHLORIDE IN A MOLTEN BATH

[75] Inventors: Aaron J. Becker, Monroeville; Don R. Careatti, Apollo, both of Pa.

[73] Assignee: Aluminum Company of America, Pittsburgh, Pa.

[22] Filed: Dec. 31, 1975

[21] Appl. No.: 645,803

[52] U.S. Cl. .......................... 423/292; 423/DIG. 12
[51] Int. Cl.$^2$ ........................................ C01B 35/06
[58] Field of Search .................... 423/292, 497, 659

[56] References Cited

UNITED STATES PATENTS

| 2,770,526 | 11/1956 | Lander | 423/497 X |
| 2,983,583 | 5/1961 | Schechter | 423/292 |

FOREIGN PATENTS OR APPLICATIONS 832,096  5/1960  United Kingdom

OTHER PUBLICATIONS

A.P.C. Publication 292,742, Pub. 7-13-1943.
A.P.C. Publication 393,258, Pub. 7-13-1943.

*Primary Examiner*—G. O. Peters
*Attorney, Agent, or Firm*—Andrew Alexander

[57] ABSTRACT

A low temperature method of producing boron trichloride comprises reacting an oxide of boron and a reducto-chlorinating agent in a molten bath comprising a combination of metal chlorides having a melting point of not more than 600° C, to form boron trichloride, and recovering the boron trichloride by vaporization from the bath.

8 Claims, 1 Drawing Figure

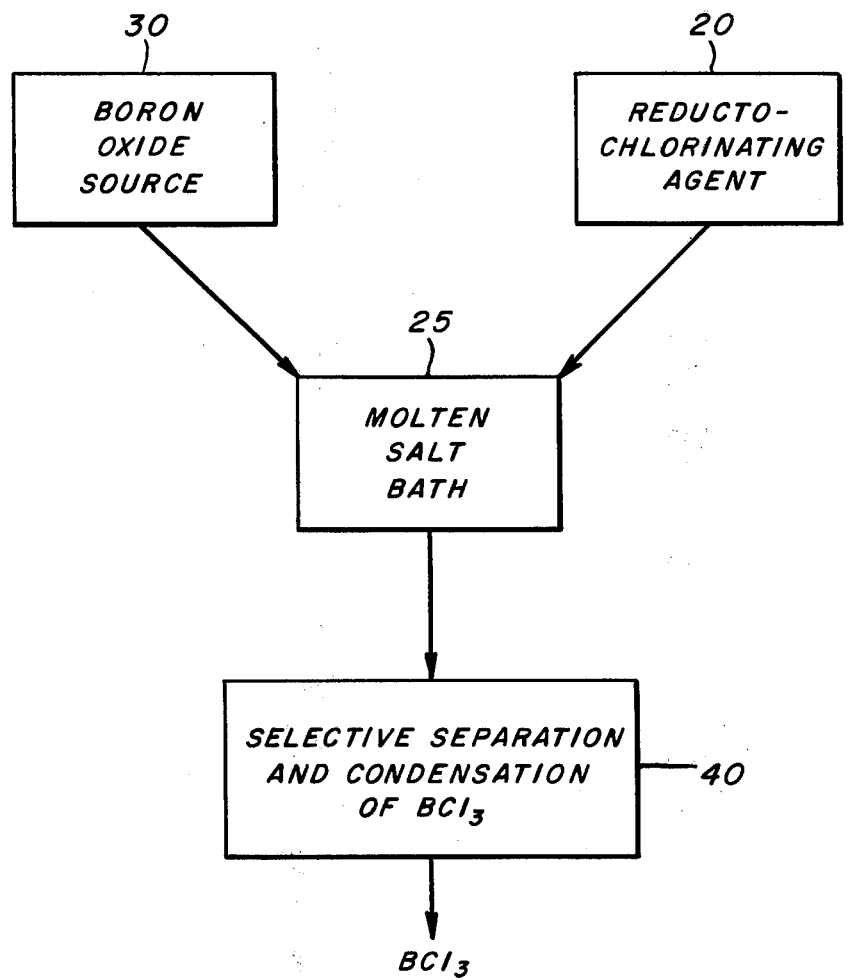

LOW TEMPERATURE METHOD OF PRODUCING BORON TRICHLORIDE IN A MOLTEN BATH

BACKGROUND OF THE INVENTION

This invention refers to boron trichloride and more particularly to a method of forming boron trichloride in a molten salt bath.

The prior art teaches various methods of manufacturing boron trichloride which include, for example, melting the reactants and bringing them together at a relatively high temperature. Specifically, Wood in British Pat. No. 832,096 teaches that boron trihalides ae obtained by the reaction in the molten state of boron oxide with alkali metal halides and that the interaction is preferably carried out at 800° to 1000° C.

Bikofsky et al, U.S. Pat. No. 3,206,283, teach that boron trichloride can be manufactured by reacting at high temperatures, the halide of a basic metal (e.g. $CaF_2$) with an anhydrous metal borate salt in the presence of silica. It is indicated that typically the reactants are heated at a temperature range from 1100° to 1600° C to effect the reaction.

British Pat. No. 887,400 recites a process for producing boron trichloride by reaction of carbon, chlorine and boron anhydride which may be formed in situ from the acid by dehydration which comprises passing chlorine gas through a mixture of boric anhydride, carbon and sodium tetraborate at a temperature at which the mixture is in a molten state which is generally a temperature in the range of 800° to 1100° C.

While the foregoing process apparently satisfactorily produce $BCl_3$ from a molten bath, they all require relatively high operating temperatures, i.e. 800° and above. It is known in the art however to produce $BCl_3$ at a lower temperature using a fluidized bed. Thus, Kratel et al, U.S. Pat. No. 3,839,538, teach the formation of boron trichloride by the reaction of alkaline earth metal borides with anhydrous hydrogen halides in a fluidized bed. The reaction is effected by passing a hydrogen halide through a fluidized bed of a heated alkaline earth metal boride. However, this process can result in small particles and dust being entrained with the reaction gases from the reactor necessitating a further separation step. This requirement can result in the production of boron trichloride being uneconomical.

Thus, a need exists for a low temperature method of producing boron trichloride in a molten bath, thus avoiding the dust problem of fluidized bed production without requiring as much energy as the molten systems in the prior art.

SUMMARY OF THE INVENTION

It is therefore an object of this invention to provide a method wherein boron trichloride can be produced in a molten bath at a temperature not greater than 800° C.

This and other objects will become apparent from consideration of the following detailed description and claims appended hereto.

In accordance with the invention, it has now been found that boron trichloride can be formed by reacting a source of boron oxide with a reducto-chlorinating agent in a molten bath containing a combination of metal chlorides having a melting point of not more than 600° C. In a preferred embodiment, the reducto-chlorinating agent is selected from the group consisting of $COCl_2$ and $CCl_4$, and the bath comprises aluminum chloride and an alkali metal chloride selected from the group consisting of NaCl and KCl.

BRIEF DESCRIPTION OF THE DRAWING

In the description below, reference is made to the sole FIGURE which is a flow chart illustrating a method for producing boron trichloride in accordance with the invention.

DETAILED DESCRIPTION OF THE PREFERRED EMBODIMENTS OF THE INVENTION

In the drawing there is provided a schematic for producing boron trichloride wherein boron oxide from source 30 and a reducto-chlorinating agent 20 are introduced to a molten bath 25 wherein these materials react to form boron trichloride in accordance with the invention. The reducto-chlorinating agent, which can be in liquid or gaseous form, can be introduced to the bottom of the bath and allowed to bubble through the molten materials therein. The boron oxide can be conveniently introduced or metered to the bath by a feeder (not shown). Boron trichloride formed can be recovered from the bath by vaporization and thereafter removed by selective separation 60 from entrained bath materials, if necessary, and later condensed.

In its broadest aspect, the bath suitable for use in the present invention comprises a combination of metal chlorides with a melting point of not more than 600° C. Preferably, at least a first metal chloride of the combination is selected from the group consisting of alkali and alkaline earth metal chlorides and a second metal chloride is selected from the chlorides of the group of metals consisting of aluminum, iron, copper, zinc, magnesium, lead and tin with aluminum chloride being most preferred. Further preferably, the bath should comprise at least 10 wt.% aluminum chloride, the balance consisting essentially of an alkali metal chloride. Of the alkali metal chlorides, sodium, potassium and lithium chlorides are preferred with sodium and potassium chloride being most preferred. In the combination of metal chlorides, as referred to above, it is preferred that the melting point of the combination be not more than 400° C.

It should be understood that the bath of the present invention is suitable as a reaction media from its melting point to its boiling point. It is preferred that the bath be operated at a temperature in the range of 400° to 800° C in order to prevent decomposition of the reducto-chlorinating agent and to obtain the energy saving benefits of these lower temperatures.

In accordance with the invention, the reducto-chlorinating agent provides a reducing agent as well as a chlorinating agent. Therefore, the term reducto-chlorinating agent as used herein is defined as a single compound which will provide both a chlorinating agent and a reducing agent. Preferably, the reducto-chlorinating agent is phosgene ($COCl_2$) or carbontetrachloride ($CCl_4$) or mixtures thereof. Also, $S_2Cl_2$ and the like may be used.

The source of boron oxide suitable for use in accordance with the present invention may be in the unrefined or natural state, e.g. orthoboric acid ($H_3BO_3$), borates such as borax ($Na_2B_4O_7 \cdot 10H_2O$), kernite ($Na_2B_4O_7 \cdot 4H_2O$) and colemanite ($Ca_2B_6O_{11} \cdot 5H_2O$). But preferably, the boron oxide should be purified $B_2O_3$ or at least substantially free of elements which would lead to contamination of the bath or the boron trichloride emanating therefrom. For example, if borax ($Na_2B$-

$_4O_7\cdot 10H_2O$) is used in the dehydrated form, NaCl, formed by reaction of the chlorine with sodium present in the borax, is preferably removed from the bath at a rate commensurate with the rate of sodium introduction thereto in the feed. The introduction of chlorine reacting material such as sodium and the like which would lead to contamination, are preferably kept to a minimum in the bath. Also, it is preferred that materials added to the bath have a low hydrogen content since hydrogen or hydrogen bearing compounds can react to form hydrogen chloride, also resulting in a loss of chlorine. Thus it can be seen why it is preferred to use purified $B_2O_3$.

While the inventors do not wish to be bound necessarily by any theory of operation, it is believed that chlorination of boron oxide, which melts at about 450° C, takes place at the interface of the molten salt of the bath and the molten boron oxide. Thus, it is believed that the yield is improved by providing a molten bath with a relatively low viscosity within the above-mentioned temperature limits. By having a low bath viscosity, the molten boron oxide and the reducto-chlorinating agents can be thoroughly dispersed throughout the extent of the bath, thereby providing a higher yield of $BCl_3$. Additionally, it is believed that it is necessary to operate the bath at the relatively low temperatures indicated hereinabove to provide high yields of $BCl_3$ since higher temperatures are believed to break up the reducto-chlorinating agent, making it more difficult to effect the reaction. That is, the reducto-chlorinating agent should not be decomposed by operating the bath above the temperatures noted since this can lower the yield of $BCl_3$.

It is preferred to operate the system of the present invention more or less continuously. Thus, after aluminum chloride and sodium chloride, for example, in a weight ratio of about 2:1 are brought to a molten state, phosgene ($COCl_2$), for example, and boron oxide ($B_2O_3$) can be added continuously and stoichiometrically. Phosgene and boron oxide may be dispersed throughout the extent of the bath with any suitable means such as an impeller. Boron trichloride formed from these reactants is recovered from the bath by vaporiztion and thereafter removed from other materials emanating therewith by selective separations.

The following examples are further illustrative of the invention.

EXAMPLE 1

A boron trichloride reaction bath was formed by combining 351.4 gms. $AlCl_3$ and 197.6 gms. KCl. To this mixture was added 100 gms. $B_2O_3$. The resulting mixture was brought to a temperature of 425° C and phosgene was bubbled therethrough at a rate of 100 cc/min. Analysis of the gases emanating from the bath revealed 29% conversion of chlorine to $BCl_3$. Substantially the same results are obtained when NaCl is used instead of KCl.

EXAMPLE 2

A boron trichloride reaction bath was formed by combining 369 gms. $AlCl_3$ with 162 gms. NaCl. To this was added 50 gms. of $B_2O_3$. The resulting mixture was brought to a temperature of 625° C and phosgene was bubbled therethrough at a rate of 100 cc/min. Analysis of the gases emanating from the bath revealed 73% conversion of chlorine to $BCl_3$.

The following example is included to illustrate the importance of the bath constituents.

EXAMPLE 3

244.2 gms. NaCl and 310.8 gms. KCl were mixed with 60 gms. of $B_2O_3$ and the mixture was brought to a temperature of 725° C. $COCl_2$ was bubbled through the molten mixture at a rate of 100 cc/min. Analysis of the gases emanating from the molten salts revealed only less than 5.0% chlorine converted to $BCl_3$. Substantially the same results were obtained at a temperature of 795° C.

To further illustrate the invention a series of reactions were run similar to Example 2 with various amounts of bath constituents and gas flow rates. The results are tabulated below:

| Bath Composition (grams) | | Boron Oxide Source | | | |
|---|---|---|---|---|---|
| $AlCl_3$ | NaCl | $B_2O_3$ (gms) | Temp. | $COCl_2$ Flow Rate | Chlorine Converted to $BCl_3$ |
| A 224.5 | 74.5 | 30 | 625° C | 1000 cc/min. | 49% |
| B 225 | 75 | 60 | 425° C | 500 cc/min. | 47% |
| C 225 | 75 | 60 | 525° C | 500 cc/min. | 57% |
| D 340 | 115 | 90 | 525° C | 500 cc/min. | 42% |

Thus, it can be seen from the examples that boron trichloride can be produced at relatively low temperatures in a molten reaction bath. Also, it can be seen that the constituents forming the reaction bath are an important feature of the invention. It will be appreciated by those skilled in the art that the conversion of chlorine to $BCl_3$ can reach 100% by increasing the reaction bath depth.

While the invention has been described in terms of preferred embodiments, the claims appended hereto are intended to encompass all embodiments which fall within the spirit of the invention.

Having thus described my invention and certain embodiments thereof, we claim:

1. A method of producing boron trichloride comprising:
   a. reacting a source of boron oxide and a reducto-chlorinating agent in a molten bath containing a combination of metal chlorides wherein at least a first metal chloride of the combination is selected from the group consisting of alkali and alkline earth metal chlorides and a second metal chloride is selected from the group consisting of aluminum, iron, copper, zinc, magnesium, lead and tin chloride, the combination having a melting point of not more than 600° C; and
   b. recovering the boron trichloride by vaporization from the bath.

2. The method according to claim 1 wherein the melting point of the molten bath is not more than 400° C.

3. The method according to claim 1 wherein the reducto-chlorinating agent is selected from the group consisting of $COCl_2$ and $CCl_4$.

4. The method according to claim 2 wherein the alkali metal chloride is selected from the group consisting of NaCl, KCl and LiCl and wherein the second metal chloride is aluminum chloride.

5. The method according to claim 1 wherein the molten bath has a temperature in the range of 400° to 800° C.

6. The method according to claim 1 wherein the source of boron oxide is $B_2O_3$.

7. A method of producing boron trichloride comprising:
   a. reacting $B_2O_3$ with a reducto-chlorinating agent selected from the group consisting of $COCl_2$ and $CCl_4$ in a molten bath comprising at least 10 wt.% $AlCl_3$, the balance consisting essentially of an alkali metal chloride selected from the group consisting of NaCl and KCl, to form boron trichloride, said bath having a temperature in the range of 400° to 800° C; and
   b. recovering the boron trichloride by vaporization from said bath.

8. The method according to claim 7 wherein the alkali metal chloride is NaCl.

* * * * *